(12) United States Patent
Baugher (10) Patent No.: US 8,024,466 B2
(45) Date of Patent: *Sep. 20, 2011

(54) SYSTEM AND METHOD FOR PROVIDING SECURITY BACKUP SERVICES TO A HOME NETWORK

(75) Inventor: Mark John Baugher, Portland, OR (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/773,752

(22) Filed: May 4, 2010

(65) Prior Publication Data

US 2010/0218242 A1    Aug. 26, 2010

Related U.S. Application Data (63) Continuation of application No. 11/411,491, filed on Apr. 25, 2006, now Pat. No. 7,730,181.

(51) Int. Cl.
*G06F 15/16* (2006.01)

(52) U.S. Cl. ............ 709/225; 713/155; 726/10

(58) Field of Classification Search .......... 709/225, 709/218; 713/155; 726/10
See application file for complete search history.

(56) References Cited

U.S. PATENT DOCUMENTS

| | | | |
|---|---|---|---|
| 5,550,981 A | 8/1996 | Bauer et al. | |
| 6,065,120 A | 5/2000 | Laursen et al. | |
| 6,438,550 B1 | 8/2002 | Doyle et al. | |
| 6,452,925 B1 | 9/2002 | Sistanizadeh et al. | |
| 6,618,858 B1 | 9/2003 | Gautier | |
| 6,675,208 B1 | 1/2004 | Rai et al. | |
| 6,826,699 B1 | 11/2004 | Sun | |
| 6,856,591 B1 | 2/2005 | Ma et al. | |
| 6,988,210 B1 | 1/2006 | Audebert | |
| 6,993,580 B2 | 1/2006 | Isherwood et al. | |
| 7,076,653 B1 | 7/2006 | Remer et al. | |
| 7,076,655 B2 | 7/2006 | Griffin et al. | |
| 7,103,574 B1 | 9/2006 | Peinado et al. | |
| 7,103,769 B1 | 9/2006 | Fleming et al. | |
| 7,114,070 B1 | 9/2006 | Willming et al. | |
| 7,143,287 B2 | 11/2006 | Bade et al. | |
| 7,149,722 B1 | 12/2006 | Abburi | |
| 7,181,620 B1 | 2/2007 | Hur | |
| 7,188,245 B2 | 3/2007 | Isozaki et al. | |
| 7,224,805 B2 | 5/2007 | Hurst et al. | |

(Continued)

FOREIGN PATENT DOCUMENTS

WO    WO2004025926    3/2004

(Continued)

OTHER PUBLICATIONS en.wikipedia.org, "Time to live", 2 pages total, Mar. 22, 2008.

(Continued)

*Primary Examiner* — Wing F Chan
*Assistant Examiner* — Ruolei Zong
(74) *Attorney, Agent, or Firm* — Stolowitz Ford Cowger LLP (57) ABSTRACT

Methods and systems of providing security backup services to a home network are described. In one embodiment, the gateway for a home network is registered with a service provider. A network device is enrolled with the home network, and periodically reenrolls. The device detects whether the gateway has been replaced between enrolling and reenrolling, and if it has been replaced, determines whether the new network gateway has been endorsed by the service provider.

17 Claims, 7 Drawing Sheets

U.S. PATENT DOCUMENTS

| | | |
|---|---|---|
| 7,287,282 B2 | 10/2007 | Yamada et al. |
| 7,322,043 B2 | 1/2008 | Letsinger |
| 7,353,384 B2 * | 4/2008 | Leyland et al. ............... 713/157 |
| 7,398,551 B2 * | 7/2008 | Thomas et al. ................. 726/10 |
| 7,634,253 B2 * | 12/2009 | Plestid et al. ................ 455/411 |
| 2002/0025042 A1 | 2/2002 | Saito |
| 2002/0112186 A1 | 8/2002 | Ford et al. |
| 2002/0114462 A1 | 8/2002 | Kudo et al. |
| 2002/0116647 A1 | 8/2002 | Mont et al. |
| 2003/0005285 A1 | 1/2003 | Graunke |
| 2003/0007646 A1 | 1/2003 | Hurst et al. |
| 2003/0023564 A1 | 1/2003 | Padhye et al. |
| 2003/0110378 A1 | 6/2003 | Yamada et al. |
| 2003/0135730 A1 | 7/2003 | Szucs et al. |
| 2003/0145214 A1 | 7/2003 | Saito et al. |
| 2003/0185233 A1 | 10/2003 | Ji et al. |
| 2003/0198351 A1 | 10/2003 | Foster et al. |
| 2003/0216143 A1 | 11/2003 | Roese et al. |
| 2003/0226011 A1 | 12/2003 | Kuwano et al. |
| 2003/0229792 A1 | 12/2003 | Baldwin et al. |
| 2003/0236991 A1 | 12/2003 | Letsinger |
| 2004/0022253 A1 | 2/2004 | Foschiano et al. |
| 2004/0022390 A1 | 2/2004 | McDonald et al. |
| 2004/0032950 A1 | 2/2004 | Graunke |
| 2004/0042413 A1 | 3/2004 | Kawamura et al. |
| 2004/0053622 A1 | 3/2004 | Nakakita et al. |
| 2004/0123152 A1 | 6/2004 | Le Saint |
| 2004/0131357 A1 | 7/2004 | Farmer et al. |
| 2004/0133780 A1 | 7/2004 | Saito et al. |
| 2004/0151179 A1 | 8/2004 | Andre et al. |
| 2004/0161108 A1 | 8/2004 | Ando et al. |
| 2004/0168062 A1 | 8/2004 | Isozaki et al. |
| 2004/0168081 A1 | 8/2004 | Ladas et al. |
| 2004/0205335 A1 * | 10/2004 | Park .............................. 713/155 |
| 2004/0213260 A1 | 10/2004 | Leung et al. |
| 2004/0225806 A1 | 11/2004 | Emura et al. |
| 2005/0004875 A1 | 1/2005 | Kontio et al. |
| 2005/0039037 A1 | 2/2005 | Sakoh |
| 2005/0063333 A1 | 3/2005 | Patron et al. |
| 2005/0074121 A1 | 4/2005 | Miura |
| 2005/0075986 A1 | 4/2005 | You et al. |
| 2005/0086514 A1 | 4/2005 | Han et al. |
| 2005/0086532 A1 | 4/2005 | Lotspiech et al. |
| 2005/0114650 A1 | 5/2005 | Rockwood et al. |
| 2005/0169473 A1 | 8/2005 | Candeloire |
| 2005/0182931 A1 | 8/2005 | Robert et al. |
| 2005/0192902 A1 | 9/2005 | Williams |
| 2005/0209972 A1 | 9/2005 | Bjorkengren et al. |
| 2005/0210261 A1 | 9/2005 | Kamperman et al. |
| 2005/0228874 A1 | 10/2005 | Edgett et al. |
| 2005/0229004 A1 | 10/2005 | Callaghan |
| 2005/0234735 A1 | 10/2005 | Williams |
| 2005/0246529 A1 | 11/2005 | Hunt et al. |
| 2006/0005254 A1 | 1/2006 | Ross |
| 2006/0010442 A1 | 1/2006 | Desai et al. |
| 2006/0059573 A1 | 3/2006 | Jung et al. |
| 2006/0112015 A1 | 5/2006 | Chancellor et al. |
| 2006/0150238 A1 | 7/2006 | D'Agostino |
| 2006/0190621 A1 | 8/2006 | Kamperman et al. |
| 2006/0198519 A9 | 9/2006 | Candeloire |
| 2007/0027814 A1 | 2/2007 | Tuoriniemi |
| 2007/0162981 A1 | 7/2007 | Morioka et al. |

FOREIGN PATENT DOCUMENTS

| | | |
|---|---|---|
| WO | WO2006074338 | 7/2006 |
| WO | WO2007050801 | 5/2007 |

OTHER PUBLICATIONS www.dtcp.com, "5C Digital Transmission Content Protection White Paper", 15 pages total, Jul. 14, 1998, Hitachi, Ltd., Intel Corporation, Matsuhita Electric Industrial, Co., Ltd., Sony Corporation, Toshiba Corporation; www.dtcp.com/data/wp_spec.pdf.

International Searching Authority, PCT/US2006/00411 International Search Report.

Nternational Searching Authority, PCT/US2006/041858 International Search Report.

Housely R. et al.; RFC 2459 Internet X.509 Public Key Infrastructure Certificate and CRL Profile; Network Working Group; Jan. 1999; 130 Pages.

Bhushan A.; RFC 114, A File Transfer Protocol; Network Working Group; Apr. 1971; 18 Pages.

www.w3.org, "Protected W3C httpd Setup," 5 pages total, Jul. 1995, W3.

Stolowitz Ford Cowger LLP; Related Case Sheet; Feb. 28, 2011; 1 Page.

* cited by examiner

Figure 1

Home Network 200
Figure 2

Figure 3

Flowchart 400

Figure 4

Flowchart 500

Flowchart 700

Figure 7

SYSTEM AND METHOD FOR PROVIDING SECURITY BACKUP SERVICES TO A HOME NETWORK

RELATED APPLICATIONS

This application is a continuation of and claims priority to U.S. application Ser. No. 11/411,491, filed Apr. 25, 2006, now issued U.S. Pat. No. 7,730,181, all of which we incorporate herein in its entirety.

BACKGROUND

1. Field of the Invention

The present invention pertains to field of home computer network security, and specifically to providing a network backup without breaching the owner's security.

2. Related Art

As more and more devices inside a home become network enabled, and as more and more commercial and private information becomes stored on such devices, the topic of home network security will become increasingly important. Unlike in a commercial environment, home users tend to be unwilling to perform redundant or laborious tasks, simply for the sake of network security. For the average home user, who is not paid to maintain his network, an ideal circumstance would be one in which a device could simply plugged in, and it would work securely and consistently.

Home network security has commercial implications as well. For example, many digital content delivery systems, such as on-demand movies transferred via cable systems, rely upon unique identification of the recipient. The more secure home networks are proved to be, the more comfortable content providers are likely to be with such delivery systems. Moreover, the more secure the home network, the less likely the consumer is to have mistaken or fraudulent transactions applied to his account.

Unfortunately, such an ideal situation is unrealistic, given current technology.

One scheme for home network security works to streamline the process. A single device, most commonly a gateway, such as a router, between the home network and the home's Internet service provider (ISP), serves as a registrar for every device on the home network. When a new device is added to the network, some method of introducing the device to the gateway is used. A number of different methods of introduction are available, ranging from a relatively simple approach like pressing a button on the gateway and device at the same time, to a more complicated and secure method, such as using a hardware dongle to transfer a unique identifier, e.g., a private or secret key, from the gateway to the device.

Additionally, or in conjunction with the above described scheme, the home gateway can also be registered with the ISP. This can be done in number of ways, such as an automated system for detecting the presence of home gateway on the ISP's network, or the customer placing a phone call at the time of home gateway installation. Such a process allows the ISP to be certain of the identity of the home gateway; that is, to be able to associate a unique gateway with unique customer, in such way that billing for individualized content delivery, for example, becomes easy and straightforward. One method of implementing this approach is to have the ISP provide the home gateway with a credential, e.g., a certificate, signed by the ISP, verifying that the home gateway belongs to this particular customer of the ISP. This credential can then be passed on to the individual devices inside the home network, for use when engaging in some network processing that requires authentication or identification.

An issue with this particular scheme, and with other similar approaches, is that a failure in the gateway results in a complete loss of registrar data, and requires that every device be reregistered with the new gateway. A similar problem occurs when the gateway is replaced, for example, because of improvements in technology. If the ISP is replaced, a similar issue occurs, in that all of the credentials provided by the ISP are no longer valid. It is a system based entirely on establishing trust: the home gateway and the ISP trust each other, because they were introduced using a trustworthy system; the home gateway and the individual network devices trust each other, again because they were introduced using a trustworthy system. If either, or both, the ISP or the home gateway is changed, the chain of trust is broken, and the relationship must be re-created from scratch.

The relationship between the home gateway and the home network devices can be backed up. At present, in order to do this, the unique identifier known only to the gateway and the device have to be stored elsewhere. However, much like sharing a password, the security of the home network is compromised when a secret key is known to more than the home gateway and the device. With that secret (such as a public/private keypair), and access to the gateway, an unauthorized device could be used to gain access to the network, and also to the customer's unique identity, as certified by the ISP.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

An embodiment of the subject invention uses public-key cryptography whereby a registrar issues certificates to a sub-registrar or petitioner device. This embodiment roots the registrar at a service provider location and roots a sub-registrar on the home network, such as in a home gateway or router. The sub-registrar and roles household devices using an authorization method such as a trusted introducer, courier introducer, or other means. In some embodiments, the household consumer must take explicit action to enroll the device or to revoke a device's enrollment. Embodiments of the present invention serve to alleviate the problem that when a consumer replaces the sub-registrar or switches to a new service provider, or both, they are forced to reenroll all devices.

Reference will now be made in detail to several embodiments of the invention. While the invention will be described in conjunction with the alternative embodiment(s), it will be understood that they are not intended to limit the invention to these embodiments. On the contrary, the invention is intended to cover alternative, modifications, and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Portions of the detailed description that follows are presented and discussed in terms of a method. Although steps and sequencing thereof are disclosed in a figure herein (e.g., FIG. 8) describing the operations of this method, such steps and sequencing are exemplary. Embodiments of the present invention are well suited to performing various other steps or variations of the steps recited in the flowchart of the figure herein, and in a sequence other than that depicted and described herein.

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "writing," "including," "testing," "using," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Computer System

Figure 1:
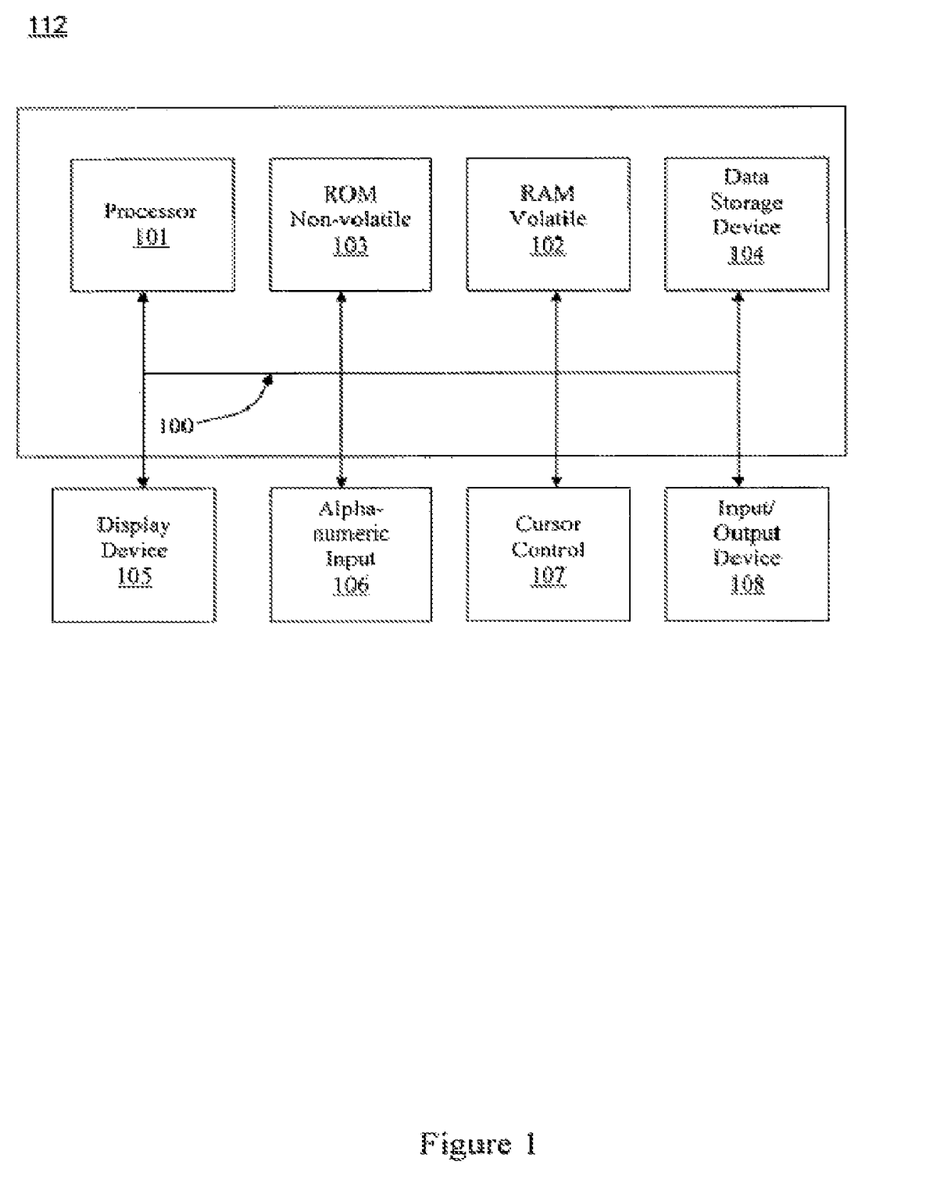
FIG. 1 is a block diagram of an exemplary computer system upon which embodiments of the present invention may be implemented.

Referring first to FIG. 1, a block diagram of an exemplary computer system 112 is shown. It is appreciated that computer system 112 described herein illustrates an exemplary configuration of an operational platform upon which embodiments of the present invention can be implemented. Nevertheless, other computer systems with differing configurations can also be used in place of computer system 112 within the scope of the present invention. That is, computer system 112 can include elements other than those described in conjunction with FIG. 1.

Computer system 112 includes an address/data bus 100 for communicating information, a central processor 101 coupled with bus 100 for processing information and instructions; a volatile memory unit 102 (e.g., random access memory [RAM], static RAM, dynamic RAM, etc.) coupled with bus 100 for storing information and instructions for central processor 101; and a non-volatile memory unit 103 (e.g., read only memory [ROM], programmable ROM, flash memory, etc.) coupled with bus 100 for storing static information and instructions for processor 101. Computer system 112 may also contain an optional display device 105 coupled to bus 100 for displaying information to the computer user. Moreover, computer system 112 also includes a data storage device 104 (e.g., disk drive) for storing information and instructions.

Also included in computer system 112 is an optional alphanumeric input device 106. Device 106 can communicate information and command selections to central processor 101. Computer system 112 also includes an optional cursor control or directing device 107 coupled to bus 100 for communicating user input information and command selections to central processor 101. Computer system 112 also includes signal communication interface (input/output device) 108, which is also coupled to bus 100, and can be a serial port. Communication interface 108 may also include wireless communication mechanisms. Using communication interface 108, computer system 112 can be communicatively coupled to other computer systems over a communication network such as the Internet, intranet (e.g., a local area network), wireless network, or wireless mesh network. Input/Output device 108 may also include a Universal Serial Bus (USB) interface for connected peripherals including security peripherals, such as a token device. In one embodiment, a USB "flash memory" device may contain a secret or accept a secret from one device and act as a "courier" to transport that secret to another device. In such an embodiment, the two devices are said to be securely "introduced" for the purposes of establishing a secure association based on the secret from the USB memory.

Figure 2:
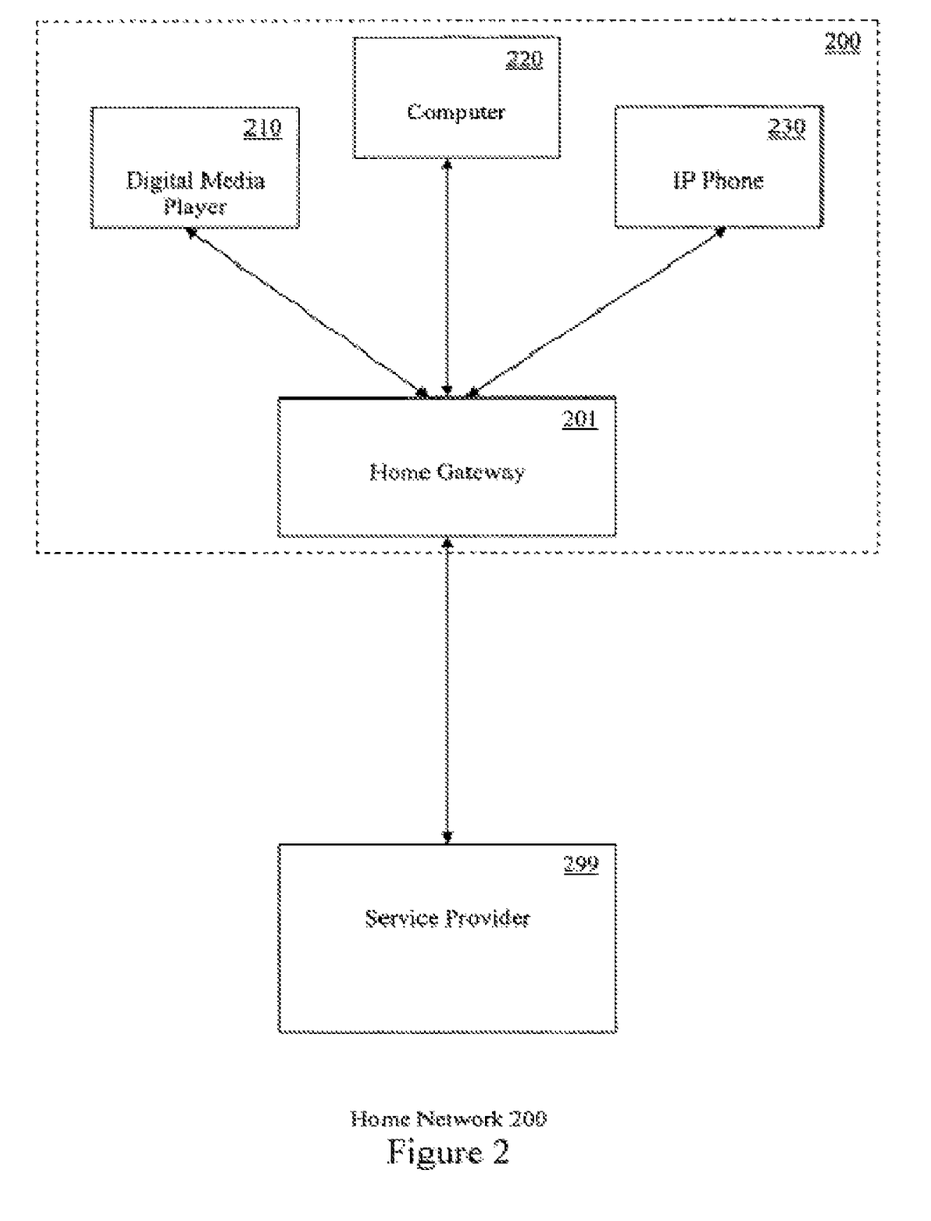
FIG. 2 is a block diagram of an exemplary home network, in accordance with one embodiment of the present invention.

With reference to FIG. 2, an exemplary home network is depicted, in accordance with one embodiment of the present invention. Home network 200 is shown as incorporating home gateway 201. Gateway 201 is connected to service provider 299, via network connection 250. Gateway 201 is also connected to a number of home network devices, shown here as digital media player 210, computer 220, and Internet protocol (IP) phone 230.

In the depicted embodiment, gateway 201 can be implemented as part of several different types of technology. For example, in one embodiment, gateway 201 is implemented as part of the customer's cable or DSL modem. In another embodiment, gateway 201 is incorporated into a network router. In yet another embodiment, the gateway may be connected to the home network and perform its dedicated security function independently of any other network functions. It is understood that embodiments of the present invention may be adapted for use with many different configurations of network, and are not limited to the depicted embodiments.

It should also be understood that while reference is made throughout to a service provider, it is not mandatory that the service provider be the same as the Internet service provider, or ISP, for a given home network. In some embodiments, while the service provider may be reachable over the Internet, the service provider provides only security backup services, such as those described herein. In other embodiments, the ISP for the home network may provide these services.

Figure 3:
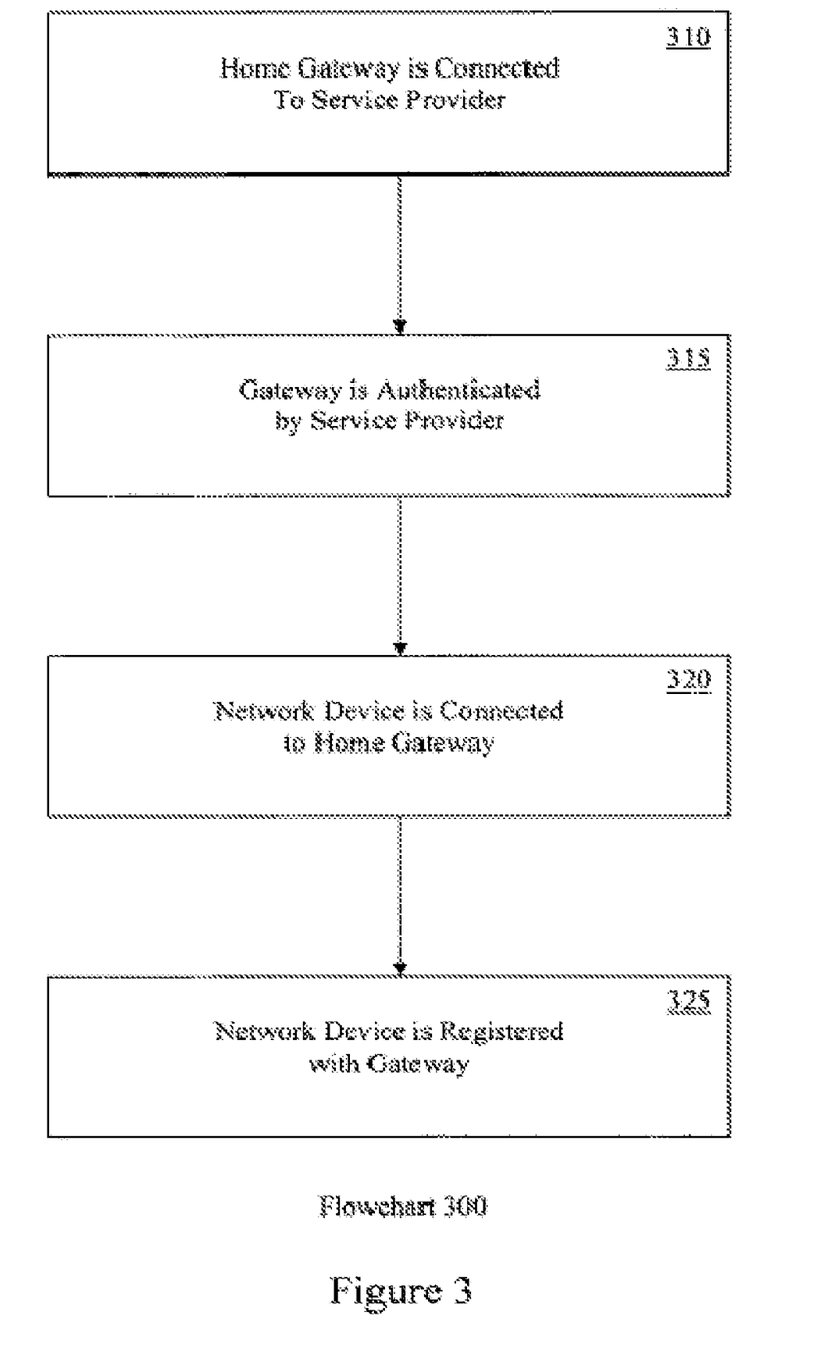
FIG. 3 is a flowchart of a method of home network device registration, in accordance with one embodiment of the present invention.

With reference now to FIG. 3, an exemplary method of home network device registration is depicted, in accordance with one embodiment of the present invention. Although specific steps are disclosed in flowchart 300, such steps are exemplary. That is, embodiments of the present invention are well suited to performing various other (additional) steps or variations of the steps recited in flowchart 300. It is appreciated that the steps in flowchart 300 may be performed in an order different than presented, and that not all of the steps in flowchart 300 may be performed.

With reference to step 310 and FIG. 2, a new home gateway is connected to a service provider. When first setting up home network 200, gateway 201 is connected to network connection 250, and hence to service provider 299. It is understood that network connection 250 can be any sort of network connection, including, but not limited to, a connection via a cable modem or DSL service.

With reference to step 315 and FIG. 2, the gateway is authenticated by the service provider. The implementation of the step will vary, in different embodiments. For example, service provider 299 may be able to identify and authenticate gateway 201, as soon as network connection 250 is connected. In other embodiments, the user may have to take some step in order to authenticate gateway 201, e.g., visiting inactivation web site, or calling a phone number. In one embodiment, service provider 299 issues gateway 201 a service provider certificate.

With reference to step 320 and FIG. 2, a network device is connected to the home gateway. Again, it is understood that the method of connecting the network device to the home gateway will vary across different embodiments. For example, a connection could be established via a wireless communication link, such as 802.11 or Bluetooth, or via a wired connection, such as ethernet. The type of device connected to the home gateway will likewise vary in different embodiments. For example, digital media player 210 can be connected to gateway 201

With reference to step 325 and FIG. 2, the network device is registered with the gateway. The method of registering the device with the gateway will vary. In a secure network, the registering will likely be accomplished by exchanging or transferring some piece of cryptographic data, e.g., a pre-shared secret key or a public part of a public/private keypair, from the gateway to the device, or vice versa. One such method is to plug a physical key, e.g., a dongle or USB flash memory device containing a pre-shared secret, into gateway 201, and then into the device, e.g., digital media player 210. Once the device is registered with the home gateway, the gateway knows that the device should be allowed access to some portion of the resources of home network 200, or access to network connection 250, as appropriate.

In one embodiment, gateway 201 provides digital media player 210 with a home gateway certificate, identifying gateway 201. In a further embodiment, gateway 201 also provides digital media player 210 with a copy of the service provider certificate. The advantages of this approach are explained more deeply below.

The "Trust" Relationship

Embodiments of the present invention provide transparent recovery of a home network, without revealing or exporting secret information, under three situations: the replacement of the home gateway, the replacement of the service provider, or the replacement of both the home gateway and the service provider. As previously stated, these embodiments do not entail copying of private keys or other secret data. Instead, embodiments of the present invention essentially backup the trust relationship that exists between the service provider, the gateway, and the network devices.

This is accomplished by treating both the service provider and the gateway as co-registrars. The backup relationship, is therefore not hierarchical. Both the service provider and the gateway, in these embodiments, have the authority and the ability to introduce and authenticate replacement registrars for the home network. When the gateway, or sub-registrar, detects that there is a different registrar at the service provider, it can vouch for the new registrar. So, should the gateway be replaced, the service provider can authenticate a new gateway for the home network; the devices connected to the new gateway trust the service provider, and can therefore trust the new gateway. Similarly, if the service provider is replaced, the gateway can authenticate a new service provider; the attached network devices trust the gateway, and can therefore trust the new service provider.

Embodiments of the present invention rely upon the physical security of the sub-registrar in the consumer's home, the physical security of the registrar in the service provider's location, and the worthiness of the service provider to be trusted to "backup" a home sub-registrar. The trust placed in the service provider is confirmed when the customer agrees to have its gateway or registrar enroll with the service provider's registrar. Given this trust, the network devices that enroll with a home network sub-registrar will cache both the service provider registrar's certificate and the sub-registrar's certificate, which is signed by the registrar. In these embodiments, the home network device uses the registrar's certificate to identify the case where a new home gateway or sub-registrar appears in the place of the previous one.

Thus, the backup does not entail copying private keys, but is a backup of "trust," where the network device recovers from the disappearance of the home network sub-registrar by trusting the registrar that issued the certificate to the previous sub-registrar.

Maintaining the Trust Relationship

Figure 4:
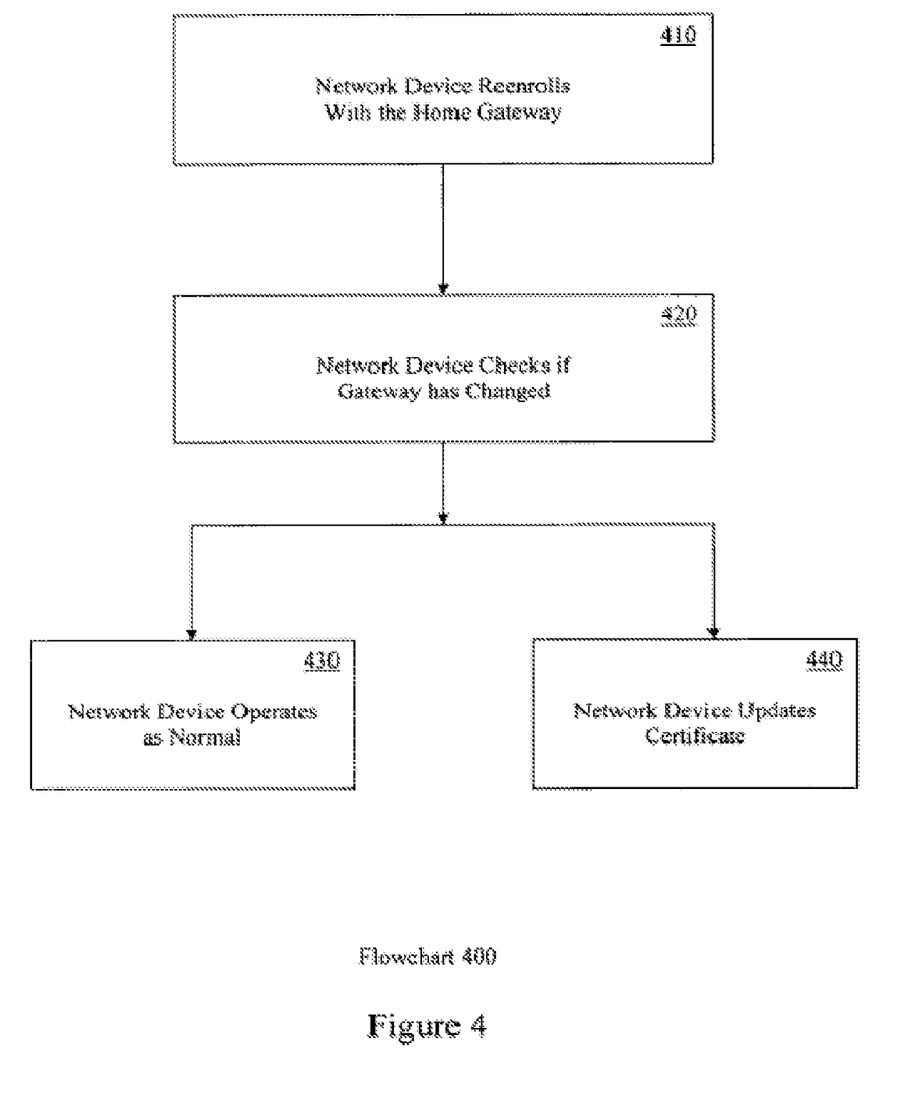
FIG. 4 is a flowchart of a method of operation for a network device, in accordance with one embodiment of the present invention.

With reference now to FIG. 4, a method of operation for a network device is described, in accordance with one embodiment of the present invention. Although specific steps are disclosed in flowchart 400, such steps are exemplary. That is, embodiments of the present invention are well suited to performing various other (additional) steps or variations of the steps recited in flowchart 400. It is appreciated that the steps in flowchart 400 may be performed in an order different than presented, and that not all of the steps in flowchart 400 may be performed.

With reference to step 410 and FIG. 2, the network device attempts to reenroll with the home gateway. In some embodiments, powering on, or power cycling, a device will cause it to attempt to reenroll with the gateway. In other embodiments, the network devices will attempt to reenroll with the home gateway, either after the expiration of some time period, or upon the occurrence of certain events. For example, digital media player 210, at the time of powerup or when attached or re-attached to the network, attempts to reenroll with gateway 201. As part of the reenroll process, gateway 201 transmits some identifiable credential, e.g., a public-key in a digital certificate, to digital media player 210.

With reference to step 420 and FIG. 2, the network device checks whether the gateway has changed, since the last successful enroll process. In some embodiments, this is accomplished by comparing the stored gateway certificate with the information received from the gateway during the reenroll process. For example, digital media player 210 compares the stored gateway certificate received previously from gateway 201, with the identifiable credential received during the reenroll process.

With reference to step 430 and FIG. 2, if the gateway public-key certificate has not changed, the network device continues to operate as normal. If, for example, gateway 201 has not changed since the last time digital media player 210 enrolled, no further action needs to occur.

With reference to step 440 and FIG. 2, if the gateway certificate has changed, the network device may need to update its certificate store. If gateway 201, for example, has been replaced since the last time digital media player 210 enrolled, then the trust relationship between digital media player 210 and the new gateway needs to be validated, before normal operation can resume.

While the method of FIG. 4 is described in terms of changes in the home gateway, the same general process can be performed with regard to the service provider. In some embodiments, upon reenrollment, the gateway provides both the service provider certificate and the gateway certificate. Rather than checking only the gateway certificate, and network device checks both certificates for changes.

Updating the Trust Relationship

As explained above, embodiments of the present invention address three different scenarios. The first scenario is one in which the service provider certificate has changed, e.g., the service provider for the home network has changed. The second scenario is one in which the gateway certificate has changed, e.g., the home gateway been replaced. The third scenario is one in which both the service provider certificate and the daily certificate has changed, e.g., both the service provider and the home gateway have been replaced. While the following discussion addresses each of these scenarios separately, it is understood that embodiment of the present invention may address any or all of these scenarios.

Figure 5:
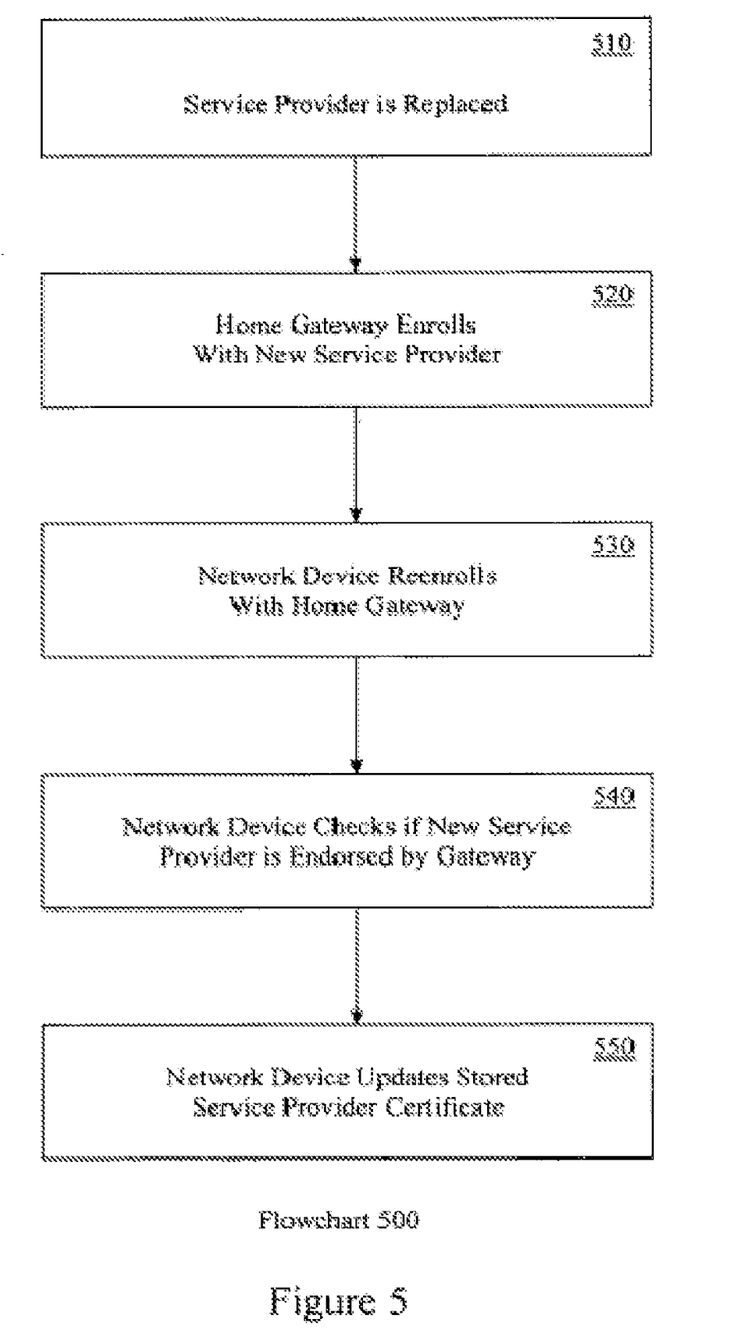
FIG. 5 is a flowchart of a method of updating a home network in the event of a change in service provider, in accordance with one embodiment of the present invention.

With reference to FIG. 5, a method of updating a home network in the event of a change in service provider is depicted, in accordance with one embodiment of the present invention. Although specific steps are disclosed in flowchart 500, such steps are exemplary. That is, embodiments of the present invention are well suited to performing various other (additional) steps or variations of the steps recited in flowchart 500. It is appreciated that the steps in flowchart 500 may be performed in an order different than presented, and that not all of the steps in flowchart 500 may be performed.

With reference to step 510 and FIG. 2, the service provider for a home network is replaced. While there are many possible reasons to replace the service provider, the rationale behind such a decision or occurrence is beyond the scope of this invention. With reference to home network 200, service provider 299 is replaced with a different service provider than the one originally enrolled with.

With reference to step 520 and FIG. 2, the home gateway enrolls with the new service provider. As noted above, the enrollment process may vary in approach and complexity. In some embodiments, the enrollment process results in the receipt of a new service provider certificate.

With reference to step 530 and FIG. 2, a network device performs a reenroll process with a home gateway, and discovers that the service provider certificate has changed since the last enroll process. For example, digital media player 210 reenrolls with gateway 201. During the reenroll process, gateway 201 sends a copy of the gateway certificate and the service provider certificate to digital media player 210. Digital media player 210 compares the gateway certificate and the service provider certificate with the stored gateway certificate and the stored service provider certificate, and discovers that the service provider certificate and the stored service provider certificate are not the same.

With reference to step 540 and FIG. 2, the network device determines whether the new service provider has been endorsed by the gateway. If, for example, the existing and trusted gateway endorses the new service provider, the new service provider certificate will be endorsed by the gateway. So if digital media player 210 reenrolls with gateway 201, and discovers that the service provider certificate has changed, because service provider 299 has changed, the new service provider certificate may be signed by gateway 201. Digital media player 210 continues to trust gateway 201, because the gateway certificate has not changed.

With reference to step 550 and FIG. 2, the network device updates the stored service provider certificate. The new certificate will then be used during future reenroll processes. For example, digital media player 210 will replace the old stored service provider certificate with the new service provider certificate received from gateway 201 during the reenroll process. The next reenroll process will then expect to see a service provider certificate reflecting the current service provider 299.

Figure 6:
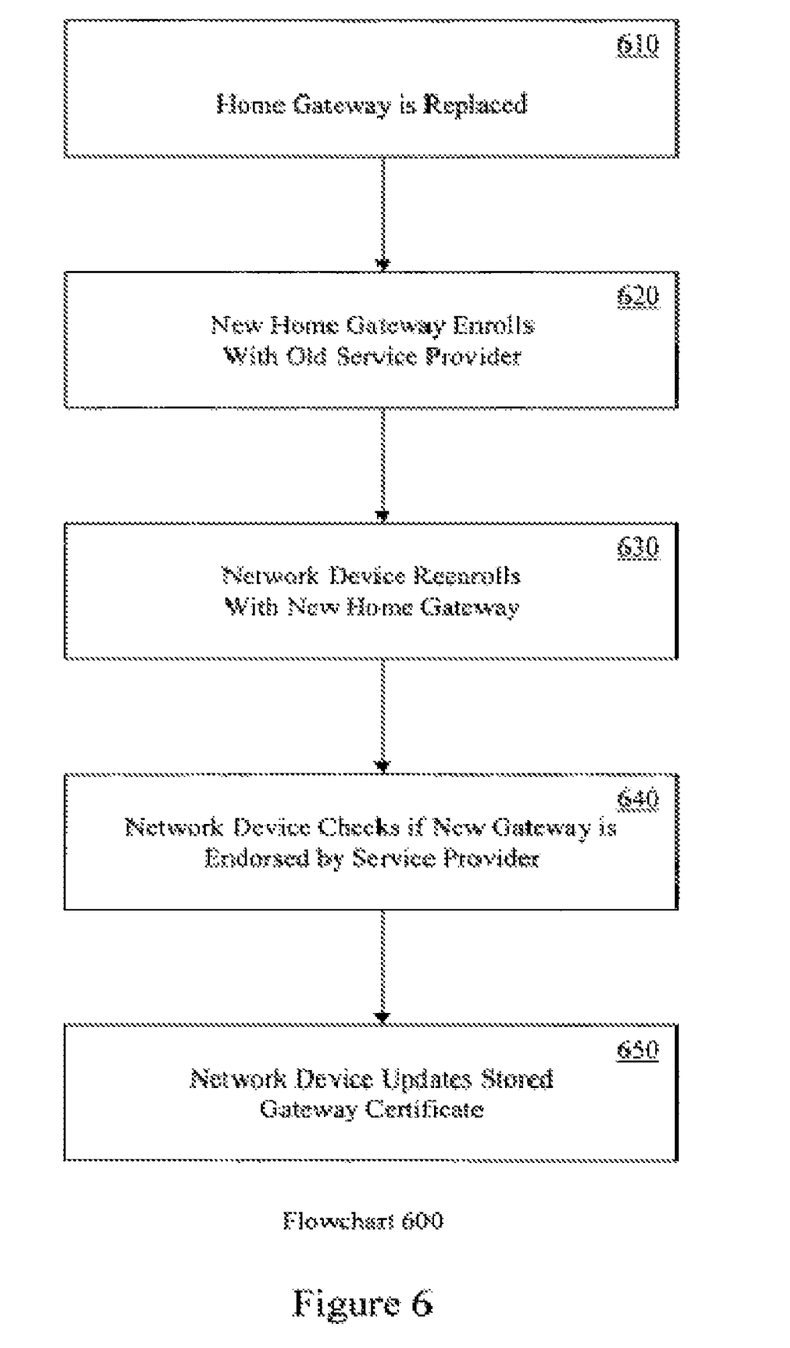
FIG. 6 is a flowchart of a method of updating a home network in the event of a change in home gateway, in accordance with one embodiment of the present invention.

With reference to FIG. 6, a method of updating a home network in the event of a change in the home gateway is depicted, in accordance with one embodiment of the present invention. Although specific steps are disclosed in flowchart 600, such steps are exemplary. That is, embodiments of the present invention are well suited to performing various other (additional) steps or variations of the steps recited in flowchart 600. It is appreciated that the steps in flowchart 600 may be performed in an order different than presented, and that not all of the steps in flowchart 600 may be performed.

With reference to step 610 and FIG. 2, the home gateway of a home network is replaced. While there are many possible reasons to replace the gateway, such as an update in technology, the rationale behind such a decision or occurrence is beyond the scope of this invention. With reference to home network 200, gateway 201 is replaced with a different home gateway device.

With reference to step 620 and FIG. 2, the new home gateway enrolls with the old service provider. As noted above, the enrollment process may vary in approach and complexity. In some embodiments, the new gateway 201 will receive the same service provider certificate as the old gateway 201, as neither the subscriber nor the service provider has changed.

With reference to step 630 and FIG. 2, a network device performs a reenroll process with the new gateway, and discovers that the gateway has changed since the last successful enroll process. For example, digital media player 210 attempts to reenroll. Upon connecting to gateway 201, digital media player 210 receives a copy of the service provider certificate and a new gateway certificate. Digital media player 210 compares these two certificates with the stored certificates, and discovers that the gateway certificate has changed.

With reference to step 640 and FIG. 2, the network device determines whether the new gateway has been endorsed by the old service provider. If, for example, the existing and trusted service provider has endorsed the new gateway, then the new gateway certificate will be endorsed by the service provider. So if digital media player 210 reenrolls with gateway 201, and discovers that the gateway certificate has changed, because gateway 201 has changed, the new gateway certificate may be endorsed by service provider 299. Digital media player 210 continues to trust service provider 299, because the service provider certificate has not changed.

With reference to step 650 and FIG. 2, the network device updates the stored gateway certificate. The new certificate will then be used during future reenroll processes. For example, digital media player 210 will replace the old stored gateway certificate with the new gateway certificate received from gateway 201 during the reenroll process. The next reenroll process will then expect to see a gateway certificate reflecting the current gateway 201.

Figure 7:
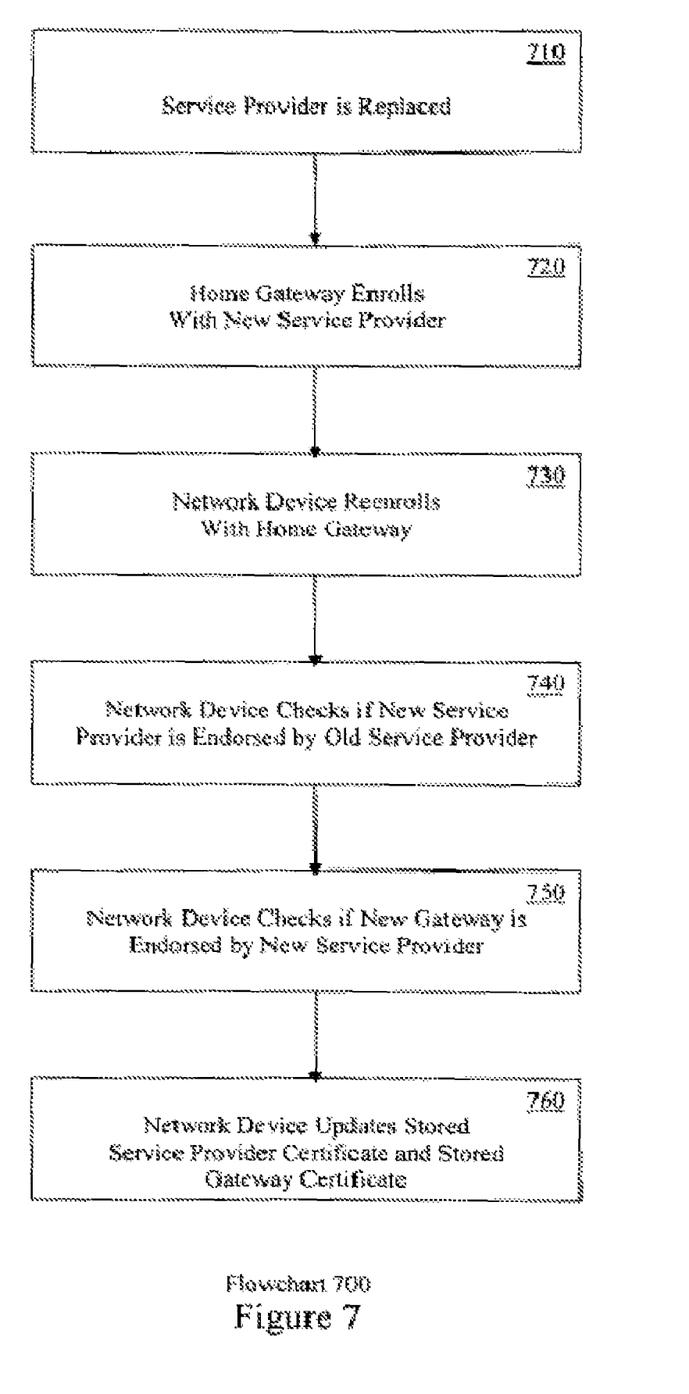
FIG. 7 is a flowchart of a method of updating a home network in the event of a change in both home gateway and service provider, in accordance with one embodiment of the present invention.

With reference to FIG. 7, a method of updating a home network in the event of both a change in the home gateway and a change in the service provider is depicted, in accordance with one embodiment of the present invention. Although specific steps are disclosed in flowchart 700, such steps are exemplary. That is, embodiments of the present invention are well suited to performing various other (additional) steps or variations of the steps recited in flowchart 700. It is appreciated that the steps in flowchart 700 may be performed in an order different than presented, and that not all of the steps in flowchart 700 may be performed.

With reference to step 710 and FIG. 2, both the home gateway of, and the service provider for, a home network are replaced. While there are many possible reasons to replace both the gateway and a service provider at once, the rationale behind such a decision or occurrence is beyond the scope of this invention. With reference to home network 200, gateway 201 is replaced with a different home gateway device, and a service provider 299 is replaced with a new service provider.

With reference to step 720 and FIG. 2, the new home gateway enrolls with the new service provider. As noted above, the enrollment process may vary in approach and complexity. In some embodiments, the new gateway 201 will receive a service provider certificate for the new service provider that has been endorsed by the old service provider. In some other embodiments, the new gateway 201 will receive a separate transfer authorization certificate, signed by the old service provider. In many embodiments of the present invention, transparent recovery after replacement of both the gateway and the service provider requires cooperation between service providers, e.g., to service providers agreeing to sign each other's transfer certificates, in order to better facilitate network recovery for their consumers.

With reference to step 730 and FIG. 2, a network device performs a reenroll process with the new gateway, and discovers that the gateway and the service provider have changed since the last successful enroll process. For example, digital media player 210 attempts to reenroll. Upon connecting to gateway 201, digital media player 210 receives a new service provider certificate and a new gateway certificate. Digital media player 210 compares these two certificates with the stored certificates, and discovers that both have changed.

With reference to step 740 and FIG. 2, the network device determines whether the new service provider has been endorsed by the old service provider. If, for example, the old, trusted service provider has endorsed the new service provider, e.g., by signing a transfer certificate, then the network device may trust the new service provider. So if digital media player 210 reenrolls with gateway 201, and discovers that both the gateway certificate and the service provider certificate have changed, and the new service provider has been endorsed by the old service provider 299, digital media player 210 can safely trust a new service provider 299.

With reference to step 750 and FIG. 2, the network device determines whether the new gateway has been endorsed by the new service provider. If, for example, the new, trusted service provider has endorsed the gateway, e.g., by signing the gateway certificate, then the network device may trust the new gateway.

With reference to step 760 and FIG. 2, the network device updates the stored gateway certificate and the stored service provider certificate. The new certificates will then be used during future reenroll processes. For example, digital media player 210 will replace the old stored gateway certificate with the new gateway certificate received from gateway 201 during the reenroll process, and the old stored to service provider certificate with the new service provider certificate received from gateway 201 during the reenroll process. The next reenroll process will then expect to see a gateway certificate reflecting the current gateway 201, and a service provider certificate reflecting the current service provider 299.

Embodiments of the present invention are thus described. While the present invention has been described in particular embodiments, it should be appreciated that the present invention should not be construed as limited by such embodiments, but rather construed according to the following claims.

The invention claimed is:

1. A device comprising:
a network gateway, in a home network, to transmit a first service provider credential to a network device, wherein the first service provider credential is configured to indicate the network gateway is registered with a first service provider and enroll the network device with the home network, wherein a second service provider credential includes a gateway certificate corresponding to the network gateway and a new service provider certificate, wherein the new service provider certificate is configured to indicate the network gateway is registered with a second service provider, the network gateway is configured to endorse the second service provider credential with a signature, wherein the network gateway is configured to transmit the second service provider credential that is endorsed by the network gateway to the network device responsive to a request to reenroll the network device with the home network, and wherein the network device is configured to reenroll with the home network based on the second service provider credential that is endorsed by the network gateway.

2. The device of claim 1, wherein the first service provider credential is configured to uniquely identify the first service provider, and the second service provider credential is configured to uniquely identify the second service provider.

3. The device of claim 1, wherein the network device is configured to determine the second service provider has replaced the first service provider, and is configured to reenroll with the home network based on the endorsement of the second service provider by the network gateway.

4. The device of claim 1, wherein the network gateway is configured to endorse the second service provider credential by signing the second service provider credential.

5. The device of claim 4, wherein the signing of the second service provider credential with the network gateway is performed when the first service provider is replaced with the second service provider.

6. The device of claim 1, wherein the network gateway is configured to exchange secret data with the network device.

7. The device of claim 6, wherein the network gateway is configured to transfer the secret data to the network device after a physical device is inserted into the network device and the network gateway.

8. A system comprising:
means for enrolling a network device in a home network utilizing a first service provider, wherein the means for enrolling the network device is configured to transmit, to the network device, a first service provider credential indicating the system is registered with the first service provider, and wherein the network device is configured to enroll with the home network based, at least in part, on the first service provider credential; and means for re-enrolling the network device in the home network that has switched to utilizing a second service provider, wherein the means for re-enrolling the network device is configured to endorse a second service provider credential including a certificate corresponding to the system and a new service provider certificate signed by the system and configured to indicate the system is registered with the second service provider, wherein the means for re-enrolling the network device is configured to transmit the second service provider credential that is endorsed by the system to the network device, and wherein the network device is configured to reenroll with the home network based, at least in part, on the second service provider credential that is endorsed by the system.

9. The system of claim 8, wherein the first service provider credential is configured to uniquely identify the first service provider, and the second service provider credential is configured to uniquely identify the second service provider.

10. The system of claim 8 further comprising means for signing the second service provider credential to endorse the second service provider for the home network.

11. The system of claim 8, wherein the means for signing is configured to endorse the service provider credential when the first service provider is replaced with the second service provider.

12. The system of claim 8, wherein the means for re-enrolling is configured to transmit a system credential to the network device and the second service provider credential that is endorsed by the system to the network device, and wherein the network device is configured to reenroll with the home network based, at least in part, on the second service provider credential that is endorsed by the system and the system credential.

13. The system of claim 8, wherein the network device is configured to determine the second service provider has replaced the first service provider, and is configured to reenroll with the home network based on the endorsement of the second service provider by the network gateway.

14. An apparatus including a memory device storing instructions configured to cause a processing system to perform operations comprising:

enrolling with a home network in response to receiving a first set of credentials from a network gateway, wherein the first set of credentials is configured to include a gateway certificate corresponding to the network gateway and a service provider certificate configured to indicate the network gateway is registered with a service provider; and reenrolling with the home network in response to receiving a second set of credentials, wherein the second set of credentials is configured to include at least one of:
  the gateway certificate corresponding to the network gateway and a new service provider certificate configured to indicate the network gateway is registered with a different service provider, wherein the new service provider certificate is signed by the network gateway,
  a new gateway certificate corresponding to a different network gateway and the service provider certificate configured to indicate the different network gateway is registered with the service provider, wherein the new gateway certificate is signed by the service provider, or
  a new gateway certificate corresponding to a different network gateway and a new service provider certificate configured to indicate a different network gateway is registered with a different service provider,
wherein the new service provider certificate or the new gateway certificate is endorsed by the signature of the network gateway or the service provider, and wherein the reenrollment with the home network is performed in response to the endorsement of the second set of credentials by the network gateway or the service provider.

15. The apparatus of claim 14, wherein the at least one new certificate is configured to uniquely identify the different service provider.

16. The apparatus of claim 14, wherein the at least one new certificate is configured to uniquely identify the different network gateway.

17. The apparatus of claim 14, wherein the new service provider certificate corresponding to the different service provider is signed by the service provider.

* * * * *